United States Patent
Sujan et al.

(10) Patent No.: US 9,868,432 B2
(45) Date of Patent: Jan. 16, 2018

(54) VEHICLE COASTING SYSTEMS AND METHODS

(71) Applicant: Cummins, Inc., Columbus, IN (US)

(72) Inventors: Vivek A. Sujan, Columbus, IN (US); Daniel R. Dempsey, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 316 days.

(21) Appl. No.: 14/711,991

(22) Filed: May 14, 2015

(65) Prior Publication Data

US 2015/0329119 A1 Nov. 19, 2015

Related U.S. Application Data

(60) Provisional application No. 61/993,927, filed on May 15, 2014.

(51) Int. Cl.

| | |
|---|---|
| *B60W 10/06* | (2006.01) |
| *B60W 30/18* | (2012.01) |
| *B60W 10/10* | (2012.01) |
| *F02D 29/02* | (2006.01) |
| *F02D 41/02* | (2006.01) |
| *F02D 41/04* | (2006.01) |
| *F02D 41/08* | (2006.01) |
| *F02D 41/12* | (2006.01) |

(52) U.S. Cl.
CPC ............ *B60W 10/06* (2013.01); *B60W 10/10* (2013.01); *B60W 30/18* (2013.01); *B60W 30/18072* (2013.01); *F02D 29/02* (2013.01); *F02D 41/0225* (2013.01); *F02D 41/042* (2013.01); *F02D 41/08* (2013.01); *F02D 41/123* (2013.01); *B60W 2030/1809* (2013.01); *B60W 2030/18081* (2013.01); *F02D 2200/0625* (2013.01)

(58) Field of Classification Search
CPC ................. B60W 10/06; B60W 10/10; B60W 30/18072; B60W 30/18; B60W 2710/0666; B60W 2030/18081; B60W 2030/1809
See application file for complete search history.

(56) References Cited

U.S. PATENT DOCUMENTS

| | | |
|---|---|---|
| 5,070,832 A | 12/1991 | Hapka et al. |
| 5,832,400 A | 11/1998 | Takahashi et al. |
| 6,561,145 B1 | 5/2003 | Stockhausen et al. |
| 7,650,224 B2 | 1/2010 | Andrea et al. |
| 8,099,220 B2 | 1/2012 | Kim et al. |
| 8,145,376 B2 | 3/2012 | Sherony |
| 8,187,149 B2 * | 5/2012 | Koenig ............... B60W 10/115 477/115 |
| 8,255,152 B2 | 8/2012 | Barth et al. |
| 8,442,732 B1 | 5/2013 | Steeby |

(Continued)

*Primary Examiner* — Huan Le
(74) *Attorney, Agent, or Firm* — Foley & Lardner LLP (57) ABSTRACT

A system for a vehicle includes a transmission, an engine, and a controller communicably coupled to the transmission and the engine. The controller is structured to receive a vehicle operating parameter, receive vehicle operation data during operation of the vehicle, determine that the vehicle is in a coasting state based on the vehicle operation data, and provide a command to control at least one of an engine and the transmission during the coasting state to at least one of optimize the vehicle operating parameter and facilitate and maintain the coasting state.

16 Claims, 5 Drawing Sheets

(56) References Cited

U.S. PATENT DOCUMENTS

| | | |
|---|---|---|
| 8,543,302 B2 | 9/2013 | Yoshikawa et al. |
| 8,585,550 B2 | 11/2013 | Watanabe et al. |
| 2011/0106388 A1 | 5/2011 | Boeckenhoff et al. |
| 2011/0130938 A1* | 6/2011 | Seok .................. B60W 10/06 701/93 |
| 2012/0116647 A1 | 5/2012 | Pochner et al. |
| 2012/0221217 A1 | 8/2012 | Sujan et al. |
| 2013/0038438 A1 | 2/2013 | Olsen et al. |
| 2013/0184949 A1 | 7/2013 | Saito et al. |
| 2014/0019022 A1 | 1/2014 | Kresse et al. |
| 2015/0158491 A1* | 6/2015 | Suzuki ............ B60W 30/18072 701/67 |

* cited by examiner

VEHICLE COASTING SYSTEMS AND METHODS

CROSS-REFERENCE TO RELATED APPLICATIONS

This application claims the benefit of U.S. Provisional Patent Application No. 61/993,927, filed May 15, 2014, which is incorporated herein by reference in its entirety.

TECHNICAL FIELD

The present disclosure relates generally to vehicle operation. More particularly, the present disclosure relates to engine and transmission control during vehicle operation.

BACKGROUND

During vehicle operation, the vehicle may occasionally operate in a coasting state. While coasting, the accelerator pedal of the vehicle is disengaged (i.e., no depression) and the vehicle moves based on its momentum. Due to friction, loss of momentum, and wind resistance, the coasting vehicle eventually comes to a stop. In the coasting state, the vehicle moves using a relatively low amount of power as compared to a motoring state of the vehicle. Accordingly, in comparison to the motoring state, the coasting state conserves fuel for the vehicle. However, a need exists for the identification of coasting opportunities and management thereof.

SUMMARY

One embodiment of the present disclosure relates to a system for a vehicle. The system includes a transmission, an engine, and a controller communicably coupled to the transmission and the engine. The controller is structured to receive a vehicle operating parameter, receive vehicle operation data during operation of the vehicle, determine that the vehicle is in a coasting state based on the vehicle operation data, and provide a command to control the transmission during the coasting state to optimize the vehicle operating parameter. In certain embodiments, the controller is structured to maintain an engine fueling rate while controlling an output speed of the transmission during a coast-down process.

In some embodiments, the command includes putting the transmission into a neutral state and maintaining an idle state of the engine while the vehicle is in the coasting state. In another embodiment, the command includes shutting down the engine and starting the engine during the coasting state. In still another embodiment, the controller is structured to determine that the engine is in an engine zero load state based on the vehicle operation data. In still another embodiment, the command includes providing a predetermined transmission output speed during a vehicle coast-down process in which a state of the transmission changes while the engine maintains a zero-fueling state.

Another embodiment of the present disclosure relates to a system for a vehicle. The system includes a transmission including a coasting speed device configured to be used with a vehicle coasting state and a coast-down process of the vehicle. The system further includes an engine. The system further includes a controller communicably coupled to the transmission and the engine, the controller structured to control the coasting speed device of the transmission in response to the vehicle being in a coasting state.

Still another embodiment relates to a system. The system includes a transmission, an engine operatively coupled to the transmission, and a controller communicably coupled to the transmission and the engine. The controller is structured to: receive vehicle operation data during operation of the vehicle; determine that the vehicle is in a coasting state based on the vehicle operation data; and provide a command to at least one of the engine and the transmission to maintain the coasting state for the vehicle.

Yet another embodiment of the present disclosure relates to a method. The method includes interpreting vehicle operation data regarding operation of a vehicle; determining that the vehicle is in a coasting state based on the vehicle operation data; and controlling at least one of a transmission and an engine of the vehicle at least partially during the coasting state to at least one of facilitate and maintain the coasting state.

Still another embodiment of the present disclosure relates to an apparatus. The apparatus includes a coasting state module structured to receive vehicle operation data and determine that the vehicle is in a coasting state based on the vehicle operation data; an active idle state management module structured to place a transmission of the vehicle into an idle state in response to the determined coasting state for the vehicle; and an engine stop/start module structured to selectively turn an engine on and off, wherein the engine stop/start module is structured to turn the engine off responsive to the determined coasting state for the vehicle. In one embodiment, the active idle state management module and the engine stop/start module are utilized at least one of independent of and in combination with each other during the determined coasting state for the vehicle.

These and other features, together with the organization and manner of operation thereof, will become apparent from the following detailed description when taken in conjunction with the accompanying drawings.

DETAILED DESCRIPTION

Referring generally to the Figures, the various embodiments disclosed herein relate to systems and methods for controlling an engine and a transmission of a vehicle. According to the present disclosure, the operation of the engine and transmission may be controlled to enable, maintain, and disable a coasting state of the vehicle. The controller may generally receive information from various vehicle subsystems relating to the current state of the vehicle, driving conditions, and other information. The controller may then determine if the vehicle is in a coasting state, and may control the transmission and/or engine to maintain the coasting state of the vehicle in order to optimize one or more vehicle operation parameters (e.g., fuel economy, trip time, exhaust emissions, etc.). According to one embodiment, the systems, methods, and apparatuses described herein are applicable with a vehicle in a low load operating state. According to other embodiments, the systems, methods, and apparatuses described herein are applicable with a vehicle in other load operating states.

Figure 1:
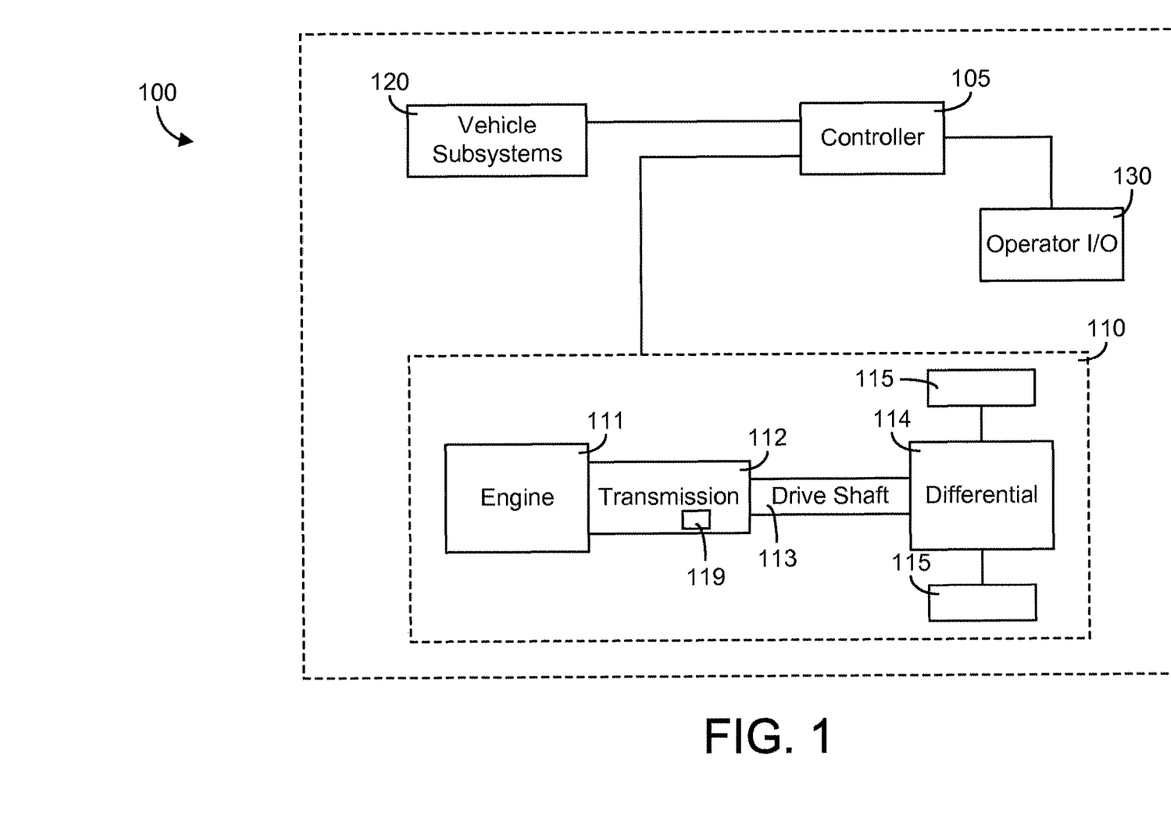
FIG. 1 is a schematic diagram of a powertrain system coupled to a controller in a vehicle, according to an example embodiment.

Referring now to FIG. 1, a schematic diagram of a powertrain system 110 controlled by a controller 105 of a vehicle 100 is shown, according to one embodiment. The vehicle 100 may be an on-road or off-road vehicle including, but not limited to, cars, trucks, vans, or any other type of vehicle that utilizes an engine and transmission. Although FIG. 1 depicts the vehicle 100 as including an internal combustion engine 111, the vehicle 100 may be powered by any type of engine system. For example, the vehicle 100 may be a hybrid vehicle, a full electric vehicle, and/or an internal combustion engine powered vehicle as shown. As such, the systems and methods described herein may be implemented for many types of vehicles and engine systems.

The vehicle is generally shown to include a controller 105 communicably coupled to the powertrain system 110, and more particularly the engine 111 and the transmission 112. Due to this integration, the controller 105 receives data from both the engine 111 and transmission 112 in addition to the vehicle itself (described below) in real time or substantially real time. The controller 105 utilizes the data to control a coasting state of the vehicle 100 as described in the present disclosure.

As shown in FIG. 1, the powertrain system 110 includes an engine 111, transmission 112, drive shaft 113, differential 114, and final drive 115. As a brief overview, the engine 111 receives a chemical energy input (e.g., a fuel such as gasoline or diesel) and combusts the fuel to generate mechanical energy, in the form of a rotating crankshaft. The transmission 112 receives the rotating crankshaft and manipulates the speed of the crankshaft (i.e., the engine RPM) to effect a desired drive shaft 113 speed. The rotating drive shaft 113 is received by a differential 114, which provides the rotation energy of the drive shaft 113 to the final drive 115. The final drive 115 then propels or moves the vehicle 100.

The engine 111 may be structured as any internal combustion engine (e.g., compression-ignition or spark-ignition), such that it can be powered by any fuel type (e.g., diesel, ethanol, gasoline, etc.). Similarly, the transmission 112 may be structured as any type of transmission, such as a continuous variable transmission, a manual transmission, an automatic transmission, an automatic-manual transmission, a dual clutch transmission, etc. The transmission 112 is shown to include a coasting speed device 119. The coasting speed device 119 may generally be configured to control the transmission 112 during a coasting state of the vehicle 100. Accordingly, the coasting speed device 119 may include one or more actuators (e.g., a hydraulic actuator, pneumatic actuator, electro-mechanical actuator, etc.) that may engage with, e.g., a dog clutch in the transmission to selectively shift transmission settings. In another embodiment, in regard to a continuous variable transmission, the coasting device 119 may control the conical transmission ratio between the engine output and the transmission output. In still another embodiment, the coasting device 119 may include or be communicably coupled to a transmission controller for the transmission 112, such that the coasting device may selectively adjust the shift schedule for the transmission 112, which the controller then implements. In this regard, the coasting speed device 119 may receive an input from the controller 105 controlling the activity of the device. The activities of coasting speed device 119 is described in greater detail in FIG. 2.

In an embodiment of the present disclosure, the transmission 112 may be designed with specific gear ratios to be used during a coasting state of the vehicle. For example, the top gear of the transmission 112 may correspond with the longest coasting time. During a vehicle coasting state or a coast-down process of the vehicle, the controller 105 may be configured to control the coasting speed device 119 of the transmission 112, and more particularly the specific gear ratios relating to the coasting state of the vehicle. The specific gear ratios may be tailored based on the type of vehicle (e.g., car, truck, tank, airplane, or any other type of vehicle that utilizes a transmission) and vehicle operation and usage. The transmission 112 and specific gear ratios are designed before use of the vehicle 100. In one example, the controller 105 receives vehicle operation data. The data is used to design/construct various components of the powertrain system 110 (e.g., transmission gear ratios) for future vehicles. In this example, the hardware components may continuously be optimized, due to the integration of the controller 105 with the powertrain system 110.

The vehicle 100 further includes various vehicle subsystems, shown as block 120, and an operator input/output (I/O) device 130. The various vehicle subsystems 120 may generally include one or more sensors (e.g., a speed sensor, torque sensor, intake manifold pressure sensor, ambient pressure sensor, temperature sensor attached to the engine, etc.), as well as any subsystem that may indicate a current state of the vehicle, engine, or vehicle system. The subsystems 120 can also include an exhaust aftertreatment system. The exhaust aftertreatment system can include any component used to reduce diesel exhaust emissions, such as selective catalytic reduction catalyst, a diesel oxidation catalyst, a diesel particulate filter, a diesel exhaust fluid doser with a supply of diesel exhaust fluid, and a plurality of sensors for monitoring the aftertreatment system (e.g., a NOx sensor).

The operator I/O device 130 may enable the driver or operator of the vehicle 100 to communicate with the vehicle 100 and controller 105. For example, the operator I/O device 130 may include, but is not limited to, an interactive display (e.g., a touchscreen display device, etc.), a shifter for the transmission, a cruise control input settings, etc. In particular, the operator I/O device 130 may include an accelerator or clutch pedal that the controller 105 may use to determine if the vehicle is in a coasting state (e.g., if the clutch pedal is not depressed, the vehicle 100 cannot be in a coasting state).

Communication between and among the components of the vehicle 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 105 is communicably coupled to the systems and components in the vehicle 100 of FIG. 1, the controller 105 is structured to receive data from one or more of the components shown in FIG. 1. For example, the data may include vehicle operating data received via one or more sensors. As another example, the data may include an input from operator I/O device 130. As described more fully herein, with this data, the controller 105 dynamically adjusts transmission and engine operation to at least one of support, facilitate, and maintain a vehicle coasting state.

As the components of FIG. 1 are shown to be embodied in a vehicle 100, the controller 105 may be structured as an engine control module ("ECM"). The ECM may include a transmission control unit and any other vehicle control unit, such as an aftertreatment controller unit, a powertrain control unit, and the like. The activities of the controller 105 is described in greater detail in FIG. 2.

Figure 2:
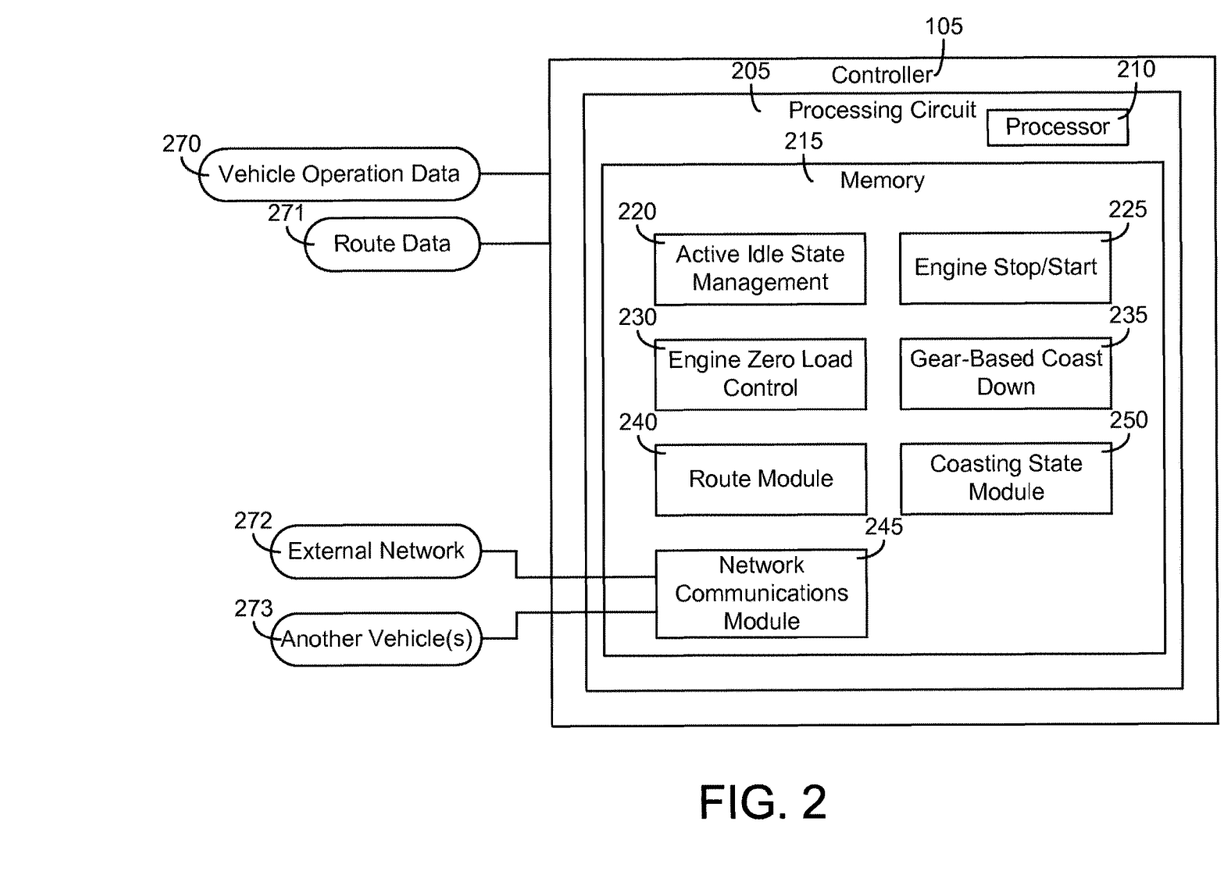
FIG. 2 is a block diagram of the controller of FIG. 1, illustrating the various mechanisms of transmission and engine control, according to an example embodiment.

As such, referring now to FIG. 2, the structure and function of the controller 105 are shown in greater detail, according to one embodiment. The controller 105 is shown to include a processing circuit 205 including a processor 210 and memory 215. The processor 210 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 215 (e.g., RAM, ROM, Flash Memory, hard disk storage, etc.) may store data and/or computer code for facilitating the various processes described herein. Thus, the one or more memory devices 215 may be communicably connected to the processor 210 and provide computer code or instructions to the processor 210 for executing the processes described in regard to the controller 105 herein. Moreover, the one or more memory devices 215 may be or include tangible, non-transient volatile memory or non-volatile memory. Accordingly, the one or more memory devices 215 may include database components, object code components, script components, or any other type of information structure for supporting the various activities and information structures described herein.

The memory 215 is shown to include various modules for completing the activities described herein. More particularly, the memory 215 includes modules configured to control the coasting speed device 119 of the transmission 112. In that regard and as shown, the controller 105 includes an active idle state management module 220, an engine stop/start module 225, an engine zero load control module 230, a gear-based coast down module 235, a route module 240, a network communications module 245, and a coasting state module 250. While various modules with particular functionality are shown in FIG. 2, it should be understood that the controller 105 and memory 215 may include any number of modules for completing the activities described herein. For example, the activities of multiple modules may be combined as a single module; additional modules with additional functionality may be included, etc. Further, it should be understood that the controller 105 may further control other vehicle activity beyond the scope of the present disclosure. With reference to the present disclosure, the activities described herein may be part of an engine control module of the controller 105 as described above.

Certain operations of the controller 105 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 3:
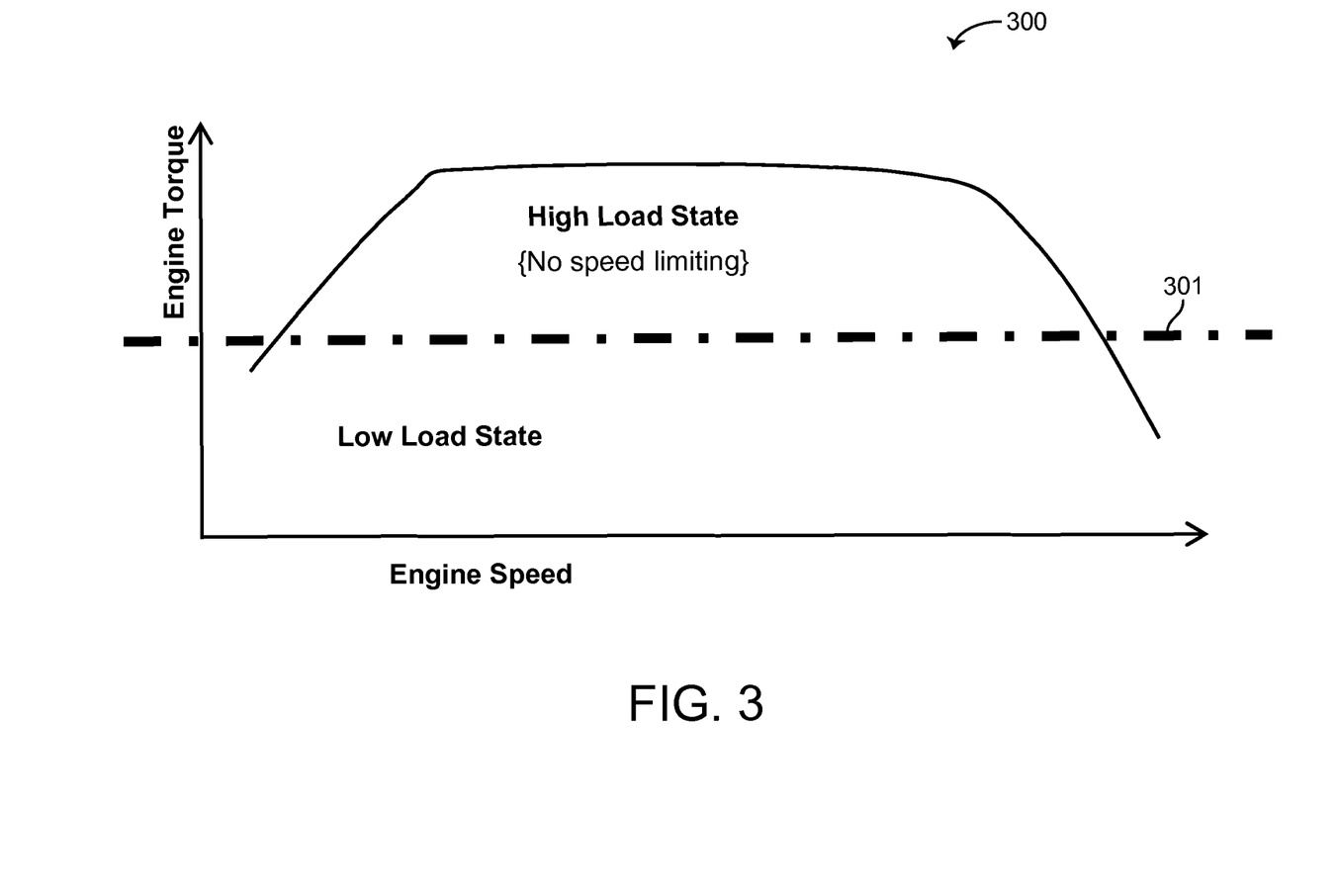
FIG. 3 is an engine torque versus speed graph, according to an example embodiment.

As mentioned above, in one embodiment, the controller 105 is structured to at least one of facilitate, support, and maintain a vehicle coasting state during low load operating conditions, such as the example shown in FIG. 3. As such, referring now to FIG. 3, an engine speed versus torque graph 300 is shown, according to an example embodiment. Here, a low load and a high load state are defined by a load threshold curve 301. The load threshold curve 301 may provide operating conditions conducive to application of the controller 105 to facilitate and/or maintain a coasting state for the vehicle. For example, when the engine load is at or below the load threshold curve 301, the controller 105 may awaken from a sleep state (which is used to conserve energy) and begin to determine if any of the modules described below should be activated based on the route data 271, operation data 270, and dynamic data 272-273 to at least one of facilitate, support, and maintain a vehicle coasting state. Because engine power is of less of a concern during coasting, a load threshold (or engine speed threshold, gear setting such as neutral, road grade condition, etc.) may be used to indicate when coasting may be used to, e.g., increase fuel economy for the vehicle and improve overall operation of the vehicle. In this regard, the controller 105 recognizes that power availability is of a relatively lesser concern in order to facilitate a coasting state.

The coasting state module 250 is structured to receive vehicle operation data 270, route data 271, and/or dynamic data 272-273 to at least one of determine that the vehicle 100 is currently in or about to be in a coasting state and identify coasting state opportunities for the vehicle (e.g., based on the route data and/or dynamic data that provides an indication of upcoming operating conditions for the vehicle). Similarly, the coasting state module 250 is also structured to determine an end or an upcoming end to the coasting state in response to the operation 270, route data 271, and/or dynamic data 272-273. Description of the identification of the coasting state or a coasting state opportunity (and thereof) in regard to the dynamic data 272-273 and the route data 271 is described herein below in regard to the other modules of the controller 105. The scope of a "coasting state" or data that indicates a coasting opportunity may be predefined via the I/O device 130 and generally relates to an engine power output state that is insufficient to propel the vehicle; hence, the vehicle may move under past generated power and/or terrain conditions (e.g., a downhill grade). In one embodiment, a coasting state may be indicated by zero or little depression (e.g., less than five percent of the available depression amount or some other calibratable amount) of the accelerator pedal while the vehicle 100 is still moving. In another embodiment, a coasting state may be indicated by zero or fueling below a threshold condition for the engine while the vehicle 100 is moving. Both of these embodiments describe a moving vehicle that is being propelled by past power, such that the vehicle is now coasting. These configurations are not meant to be limiting as other definitions and conditions indicative of "coasting" or a "coasting state" may also be used by the coasting state module 250. To that end, the coasting state may be based on at least one of an operator input and vehicle operation data 270 (e.g., the operator input may designate when coasting is occurring, the operation data 270 may provide conditions indicative of coasting opportunities, etc.). In this regard, an end or an upcoming end to the coasting state may be indicated by data including, but not limited, a vehicle speed reduction below a predefined amount (e.g., a five percent allowable reduction relative to a pre-coasting state speed, a user-defined vehicle speed threshold, etc.), an engine speed reduction below a predefined amount (e.g., a five percent allowable reduction relative to a pre-coasting state engine speed, a user defined engine speed threshold, etc.), an engine torque and/or other powertrain component torque reduction below a predefined amount (e.g., a five percent allowable reduction relative to a pre-coasting state torque amount, a user defined torque range where torques in that range indicate a coasting state and torques below or above that range are outside of the coasting state, etc.), one or more road conditions (e.g., a grade change to an uphill portion, a predefined distance at a certain road grade amount, etc.), an explicit operator input, and the like. It should be understood that the following list of beginning/end coasting state indicators is not meant to be exhaustive as the present disclosure contemplates many other types of beginning/end indicators that are intended to fall within the spirit and scope of the present disclosure.

The vehicle operation data 270 includes data regarding current operating conditions for the vehicle and may include, but is not limited to, a vehicle speed, a current transmission gear/setting, a load on the vehicle/engine, a position of an accelerator (e.g., whether the accelerator pedal or button is depressed, etc.), a position of a clutch, a shifter position, a throttle position, a set cruise control speed, data relating to the exhaust aftertreatment system, an output power, an engine speed, a fluid consumption rate (e.g., fuel consumption rate, diesel exhaust fluid consumption rate, etc.), any received engine/vehicle faults (e.g., a fault code indicating a low amount of diesel exhaust fluid), engine operating characteristics, etc. Data relating to the exhaust aftertreatment system includes, but is not limited to, NOx emissions, particulate matter emissions, and conversion efficiency of one or more catalysts in the system (e.g., the selective catalytic reduction catalyst).

The active idle state management module 220 is structured to maintain an idle state of the engine 111 when the vehicle 100 is in a coasting state or likely to be in a coasting state. If the vehicle 100 is in a coasting state and the engine 111 is idle, then the transmission 112 may be moved into a neutral setting by the module 220 and the coasting speed device 119. In this regard, the active idle state management module 220 may include communication circuitry to command the coasting speed device 119 to shift the transmission 112 into neutral. In other embodiments, the active idle state management module 220 may include one or more actuators operatively attached to the shifter that, upon a command or an instruction, can move the shifter into a desired gear of the transmission.

In certain embodiments, the active idle state management module 220 may include one or more triggering mechanisms. The triggering mechanisms may include a timer, a distance tracker, a load tracker, and any other triggering mechanism activated by the identification of a coasting opportunity (e.g., a grade tracker, etc.). That is to say, each of the trigger mechanisms may define when a "coasting state" is happening or about to happen to avoid transient coasting state designations. For example, a timer may be preset to five seconds of coasting behavior detection before actuation into idle by the transmission (e.g., a shift to neutral). In this regard, if an operator briefly releases their foot from the accelerator pedal and re-depresses the pedal in less than five seconds, the active idle state management module 220 does not provide a command to move the transmission into an idle state (e.g., neutral). In another example, if the grade is detected to be a downhill (based on predefined standards in the module 220), the module 220 may at least one of automatically shift the transmission into neutral or provide an indication to an operator of the vehicle via the I/O device 130. Of course, as will be appreciated by those of ordinary skill in the art, the precise functionality and type of triggering mechanisms is highly configurable with all such variations intended to fall within the spirit and scope of the present disclosure.

The engine start/stop module 225 is structured to start and stop the engine 111 during or in advance of a vehicle coasting state. If the vehicle 100 is in or about to be in a coasting state, the module 225 may turn off the engine to allow the vehicle 100 to conserve energy in facilitation of the coasting state. Module 225 may send a command to the engine 111 to shut off, and the engine 111 may restart using the vehicle momentum and by popping the clutch and/or by an operator input. Similarly, the operator can also provide an input to turn off the engine while coasting via module 225. In this regard, the module 225 may include a starter motor for the engine, control and communication circuitry for instructing one or more components (e.g., the starter motor), and any other component used to start/stop the engine.

Similar to the active idle state management module 220, the engine start/stop module 225 may include one or more triggering mechanisms. In this regard, the engine start/stop module 225 may include a first triggering mechanism that indicates when the vehicle is in or about to be in a coasting state to shut the engine off (e.g., after a predefined amount of time, distance; a grade condition or a series of grade conditions such as vehicle operation data 270 indicating a downhill grade for a certain amount of time; an explicit operator input; etc.). The engine start/stop module 225 may also include a second triggering mechanism that indicates and provides a command to restart the engine based on at least one of an operator input, the vehicle operation data 270 (route data 271 and dynamic data 272-273, which are described herein).

The restart may be based on a user input (e.g., depression of the accelerator pedal, actuation of the ignition button for the vehicle, depression of the clutch, movement of the shifter into a gear, a voice command, etc.). However, in other embodiments, at least one of the stop and restart may be automated or semi-automated by the module 225 in combination with the route module 240 and the network communications module 245 and the vehicle operation data 271. The route module 240 is structured to receive route data 271, wherein the route data 271 is indicative of an upcoming terrain of a designated route of the vehicle 100. The route may be designated via the I/O device 130 and the route data 271 may include, but is not limited to, latitude data, longitude data, altitude data, a posted speed limit, signage for the route, and curvature data for the route. In this regard, the controller 105 receives an indication of the terrain conditions upcoming for the vehicle. However, this data is largely static in nature (e.g., posted speed limits are unlikely to change, the road curvature and road grade are unlikely to change, etc.). Accordingly, the network communications module 245 is structured to receive data to dynamically determine the terrain conditions upcoming or likely upcoming for the vehicle 100 (e.g., based on a designated route for the vehicle). The network communications module 245 is structured to communicate with at least one of another vehicle 273 (e.g., via short-range to medium-range wireless communication, etc.) and an external network 272 (e.g., a central server, database, a fleet manager, a traffic center, global positioning systems, etc.) to establish an intelligent transportation system (ITS). In this regard and in some embodiments, the network communications module 245 may include communications circuitry that facilitate the exchange of information between and among the another vehicles 273 and the external network 272. The communications circuitry may allow the network communications module 245 to send and/or receive data regarding the vehicle 100, other vehicles, traffic conditions, road conditions, and the like. The network communications module 245 may provide an operator with real-time travel and traffic information via the operator I/O device 130, such as transit routes and schedules, navigation directions, and information about delays due to congestion, accidents, weather conditions, road repair work, etc. In some embodiments, the network communications module 245 is able to inform an operator of the vehicle 100 in real-time of his/her precise location, inform him/her of current traffic or road conditions on a current and/or surrounding roadways, and empower him/her with optimal route selection and navigation instructions. Further, the network communications module 245 may receive information/data regarding one or more other vehicles. The communication between the vehicles may be vehicle-to-vehicle or vehicle-to-server-to-vehicle (i.e., vehicle-to-"x" type communication). The vehicle-to-vehicle communication circuitry that may, in some embodiments be included with the module 245, be performed via any suitable short to medium range wireless communications protocol (e.g., Wi-Fi, infrared, radio, RFID, near-field communications (NFC), Bluetooth, etc.). The vehicle-to-server-to-vehicle (generally, vehicle-to-x) communication circuitry that may, in some embodiments be included with the module 245, be performed via any suitable long range wireless communications protocol. The data regarding the other vehicle(s) may include, but not limited to, a current speed of the other vehicle, a current location of the other vehicle, a type of the other vehicle, and the like. The current speed of the other vehicle may include an absolute speed of the other vehicle or a relative speed of the other vehicle in relation to the vehicle 100. The current location of the other vehicle may include an absolute location of the vehicle (e.g., GPS coordinates, etc.) or a relative distance of the other vehicle in relation to the vehicle 100.

Accordingly, as briefly mentioned above, the engine stop/start module 225 may receive the vehicle operation data 270, which provides an indication of current operating conditions, track the data for a predefined amount of time, and at least one of project an upcoming condition(s) (e.g., via a projection function, an extrapolation function, a model, etc.) or utilize the current operating conditions to selectively stop and start the engine based on identified coasting opportunities. For example, a user may have provided an affirmative input that coasting is occurring and the module 245 turns the engine off. After a certain amount of coasting, the data 270 may then indicate that the grade of the route is increasing beyond a predefined acceptable rate and in response, the module 245 provides a command to restart the engine. In another example, the operation data 270 may indicate that the vehicle is on a downhill grade and the load on the engine is below a threshold (e.g., threshold 301), thereby identifying a coasting opportunity. In this example, two indicators (load and grade) were used to identify a coasting or potential coasting state; other configurations may use one indicator, three indicators, and any other desired amount of indicators. The module 245 may either automatically turn the engine off or provide this information to the operator via the I/O device 130 and ask if he/she would like to turn the engine off responsive to this identification. Once the operation data 270 begins to indicate that the downhill grade is decreasing and flattening or turning to uphill, the module 245 may either restart the engine or ask the operator if he/she would like to restart the engine. In another embodiment, the coasting state may be maintained until the vehicle operation data 270 indicates an inhibitor (e.g., restart trigger) to the coasting state. For example, vehicle speed may have decreased below a preset threshold relative to the speed pre-coasting state (e.g., a user may define plus-or-minus three miles-per-hour relative to the speed before coasting and if the vehicle speed decreases by three miles per-hour or more, the engine is restarted; in other embodiments, the decrease/increase amount may vary based on the reference or pre-coasting speed (e.g., at 55 miles-per-hour, there is a plus-or-minus 5 miles-per-hour band and at 20 miles-per-hour, there is a plus-or-minus 2 miles-per-hour band; etc.). Using vehicle speed is not meant to be limiting, however, as other indicators of coasting state inhibitors/engine restart triggers may also be used. For example, other restart triggers such as engine speed, grade, and the like may also be used. All such variations are intended to fall within the spirit and scope of the present disclosure.

In comparison, with the route data 271, the module 225 may proactively plan areas on a route where the engine may be stopped and re-started. Of course and as mentioned above, demarcation of coasting state opportunity areas/regions is highly variable. For example, if the downhill road grade is between two (2) percent and four (4) percent, the module 225 determines that a coasting opportunity exists but only until the downhill grade is approximately equal to one (1) percent. However, if the downhill grade is greater than four (4) percent, then the module 245 determines that the coasting state exists until the downhill grade is approximately zero (0) percent (i.e., recognizing that a steeper grade may provide an enhanced coasting opportunity relative to a flatter downhill grade). This determination may be based on the size of the vehicle, the vehicle speed, environmental conditions (e.g., wind speed at various locations, terrain of the road (e.g., blacktop versus gravel, etc.), the target vehicle speed (which may be defined as a function of speed, such as "I want to travel at five miles-per-hour over the posted speed limit."). In this regard, using physics, the module 225 may determine when the vehicle speed is expected to go below the user-defined threshold. At which point, the module 225 determines that the engine should be re-started before that point in the route. Of course, when the coasting state ends/begins is highly variable. Accordingly, while the module 245 with the route data 271 may proactively plan route areas for activation of the engine stop/start module 225, these demarcations may change from application to application based on user preferences (e.g., "I never want to go above the posted speed limit," etc.). Further, and as described herein below, this functionality may be based on optimization of one or more vehicle operating parameters.

To provide additional enhancement, the engine stop/start module 225 may also utilize the external network 272 and another vehicle(s) 273 via the network communications module 245 to dynamically determine opportunity areas for coasting and, therefore, engine stop/start. For example, while the route data 271 may indicate an upcoming downhill grade that indicates a coasting opportunity, another vehicle 272 may communicate that a crash is currently blocking the vehicle's 100 lane, such that the coasting opportunity will not be able to be had. Conversely, the external network 272 may indicate that an upcoming downhill grade has no traffic on it to affirm the route data 271 that an upcoming coasting opportunity for the vehicle exists. At or near when the vehicle 100 is reaching the coasting opportunity area, the I/O device 130 may ask the operator if they would like to turn the engine off, prompt the operator to turn the engine off, or turn the engine off (if fully automated operation is selected by an operator). In this regard, the identified coasting state opportunities for the vehicle may be modified in response to the dynamic data (e.g., cancelled; another coasting state opportunity may be identified; the region corresponding to the identified coasting state opportunity from the route data may be increased, decreased, or confirmed via the dynamic data; etc.).

The engine zero load control module 230 is configured to control the engine 111 and transmission 112 to achieve or substantially achieve a zero load state of the engine 111 with respect to the driveline (e.g., the remaining components of the powertrain). During zero load, the module 230 enables a coast-down process, allowing the vehicle 100 to coast longer while the vehicle 100 is in or substantially in a zero load state, before entering a fully-motoring state. In an engine, there is a traditional power coming out of the driveshaft (the useable work to, e.g., propel the vehicle) and a power that is coming out of the combustion chamber. These two powers may not be the same. There is a certain amount of combustion power that is lost (e.g., friction, bearings, pistons, pumping (e.g., air flow restrictions), etc.). For example, combustion power may need to generate 120 horsepower to have 100 horsepower in workable power, due to the losses in the combustion power (e.g., bearings, gears, etc.). However, and for example, in certain conditions a negative torque may be provided to the engine 111 (e.g., the vehicle is backdriving the engine from, e.g., going downhill where gravity is pulling the vehicle and causing the wheels to turn, to turn the driveshaft, to backdrive the engine 111). The engine is being kept at a particular speed because the vehicle is forcing it to spin at that the speed and the engine is providing negative torque to the driveline. That is to say, the torque from the powertrain (minus the engine) is greater than the engine, such that the engine is providing a negative torque to the transmission, driveshaft, wheels, and differentials (e.g., the remaining portions of the powertrain). In this case, the negative torque from the engine may actually slow or inhibit coasting of the vehicle. Accordingly, the engine zero load control module 230 is structured to control fueling to output workable power from the engine 111 to cancel or substantially cancel the negative torque to achieve or substantially achieve a net zero torque or power situation. In this regard, by eliminating or substantially eliminating the negative torque on the driveline, a coasting state may be prolonged for the vehicle 100 to, e.g., increase fuel economy for the vehicle. Moreover, the minimal amount of fuel used to achieve or substantially achieve net zero power is offset by the extended coasting achieved (and the, in turn, would-be fueling required to power the vehicle that distance). Of course, the duration of net zero power output (and, consequently, coasting) may be predefined and is highly variable (e.g., when the vehicle speed decreases to at or near a threshold, when the fueling needed to maintain the net zero power at the start of coasting is in excess of the negative torque by more than a predefined amount (in which case, the workable power is propelling the vehicle, etc.).

To determine the fueling conditions needed for the engine to achieve or substantially achieve a net zero power, a variety of processes may be used by the module 230. One such process is via operator interaction—a "feel" situation. For example, an operator may feel when the negative torque is cancelled by the engine no longer slowing the vehicle down when the operator is not commanding fuelling. Another such process is to determine negative torque via at least one of physical and virtual sensors. For example, a torque sensor may be positioned on the drive shaft and/or wheels of the vehicle while another torque sensor is positioned on the crankshaft of the engine (e.g., a driveshaft torque sensor, a wheel torque sensor, etc.). If a coasting state is identified and the driveshaft torque is greater than the engine torque, a negative torque situation may be identified. The torque difference may represent the increase in engine torque needed to achieve net zero torque. Fueling maps, tables, and the like may then be used to back-calculate the amount of fuel needed to achieve this engine torque output. In regard to a hybrid vehicle, the torque from the wheels and/or drive shaft (or, more generally, driveline) may be readily determined from the regenerative braking devices, such that the module 230 may be readily implemented with the hybrid vehicle. In still another example process, a model, look-up table, algorithm, formula, and the like may be created and stored in the module 230 that is based on the operating conditions indicative of a negative torque (and fueling conditions associated with each set of condition) to determine readily the fueling needed or substantially needed to achieve a net zero power output. These formulations may be determined using apriori calculations. Accordingly, the above-mentioned processes may be used independent of one another, in some combination, and/or be application-specific. All such variations are intended to fall within the scope of the present disclosure.

In one embodiment, the module 230 may provide a command to maintain the current transmission setting during the net zero power situation to avoid transients (e.g., gear-hunting events) from adjusting the transmission setting. In another embodiment, the transmission settings may vary as the load and speed on the changes.

The term "substantially" as used in cancelling the negative torque is intended to broadly interpreted. In one embodiment, "substantially" refers to an engine torque that is within a predefined amount of the driveline torque (e.g., a constant amount such as five foot-pounds, a variable amount (e.g., 5 foot-pounds at vehicle speeds less than 30 mph, 10 foot-pounds at vehicle speeds between 31 and 40 mph, etc.), and the like). In another embodiment, "substantially" may refer to an exact engine torque amount that cancels the torque from the driveline. In still another embodiment, "substantially" may refer to a predefined amount of engine torque above the driveline torque (e.g., five percent above the driveline torque). In this example, the engine may be slightly powering the vehicle, but the majority of acceleration power comes from the coasting. It should be appreciated that other definitions of "substantially" may also be included, such that the aforementioned list is not meant to be exhaustive.

Like the engine stop/start module 225 or the active idle state management module 220, the engine zero load control module 230 may utilize route data 271, external network 272 data, and another vehicle(s) 273 data to dynamically control gear changes and the engine during the coasting process to achieve or substantially achieve a relatively longer coasting duration. For example, the dynamic data and/or route data may provide an indication of terrain areas that where workable power output from the engine 111 may be needed. For example, the route data may indicate an upcoming hill, such that the fueling should increase before the hill to achieve a vehicle speed desired for traversal. In this regard, the dynamic data and route data may be used to strategically map and plan implementation of the module 230 (and the other modules described herein).

The gear-based coast-down module 235 is structured to adjust a transmission setting to at least one of facilitate, maintain, and support a coasting state by matching or substantially matching an engine speed/torque and a driveline speed/torque. Here, rather than increasing fueling to achieve or a substantially achieve a net zero torque (described above in regard to module 230), gear-based coast-down module 235 may selectively adjust the transmission ratio to achieve or substantially a net zero power between the engine 111 and the driveline. Because each transmission setting affects a speed/torque output from the engine, the transmission can be adjusted to match or substantially match the engine speed and driveline speed (e.g., wheels, driveshaft, etc.) to achieve a relatively longer duration coasting state to, e.g., conserve fuel. The same processes for determining the torque needed or substantially needed from the transmission may be used with the gear-based coast down module 235. The module 235 may reference torque output settings for the transmission (e.g., transmission torque-speed maps, etc.) to selectively locate the setting. Similar to the module 230, the module 235 may be augmented with route data and dynamic data in addition to the operation data to selectively control activation. Further, the term "substantially" as used in regard to the gear-based coast down module 235 may have a similar definition as above in regard to the engine zero load control module 230 (e.g., substantially may refer to a transmission output torque that is within a predefined amount of the engine and remaining driveline torque, etc.).

As an example, coasting at 55 miles-per-hour may be achieved by $9^{th}$ gear or $10^{th}$ gear. However, due to the relatively lower driveline torque, $10^{th}$ gear may promote a longer coasting distance because of $10^{th}$ gear's relatively lower torque output as compared to $9^{th}$ gear. This information may be provided to the operator via the I/O device 130 or automatically implemented if, for example, an automatic transmission is used in the vehicle.

The modules described herein may generally be used to control the transmission 112 and the coasting speed device 119. As mentioned in FIG. 1, the transmission 112 may be designed with specific coasting gears to assist in a vehicle coasting state or coast-down process. The modules described herein may be configured to control the coasting gears of the transmission 112, or in other embodiments may control any other aspect of the transmission 112 and the coasting speed device 119. In other words, the transmission 112 has specific coasting gears configured to be used in accordance with the activities of the controller 105 described herein.

Figure 4:
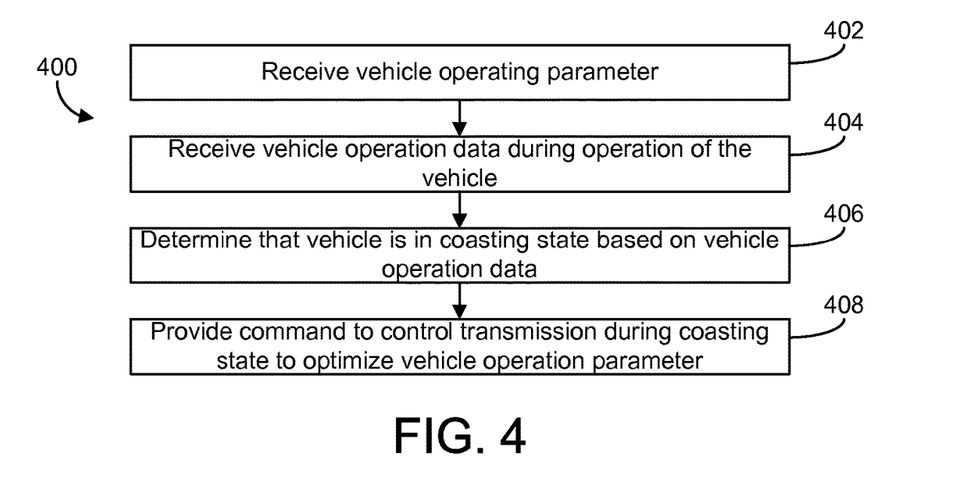
FIG. 4 is a flow diagram of a method for dynamically controlling the transmission and engine of the powertrain system, according to an example embodiment.

Referring now to FIG. 4, a flow chart of a method 400 of controlling a vehicle coasting state is shown, according to an exemplary embodiment. The method 400 may be implemented using controller 105 of FIGS. 1-2. Accordingly, method 400 is described with reference to FIGS. 1-2.

The controller 105 receives a vehicle operating parameter (step 402). Vehicle operating parameters may include, but are not limited to, engine noise, trip time, an acceleration ability of the vehicle, fluid consumption (e.g., fuel consumption, diesel exhaust fluid consumption, coolant consumption, etc.), power output, an emissions characteristic, etc. The vehicle operating parameters may be used to determine an optimal mode of operation of the vehicle. For example, the method 400 may control the transmission or engine during a coasting state in order to meet a maximum fuel consumption parameter or maximum power output parameter.

The controller 105 receives vehicle operation data during operation of the vehicle (step 404). The vehicle operation data is obtained from the components and systems shown in FIG. 1 (e.g., vehicle subsystems 120 and/or operator I/O 130). For example, the vehicle operation data includes, but is not limited to, the vehicle speed, the current transmission gear/setting, the load on the vehicle/engine, if the clutch is depressed, if the accelerator pedal is depressed, etc.

The controller 105 determines if the vehicle 100 is in a coasting state based on the vehicle operation data (step 406). For example, the vehicle 100 may be determined to be in a coasting state if the clutch pedal of the vehicle 100 is depressed, or if the transmission gear is in neutral, or if the speed sensor indicates the vehicle is moving but the accelerator pedal is not depressed, etc.

The controller 105 provides a command to control the transmission during the coasting state to optimize the vehicle operating parameter (step 408). In one example, controlling the transmission during the coasting state may lead to less fuel consumption or less power output from the vehicle 100. Controlling the transmission and engine may generally include turning the engine on and off, keeping the transmission in gear, maintaining a current engine state, or otherwise. The types of commands to control the transmission and engine are described in greater detail in FIG. 2.

In regard to control of the desired operating parameter, the controller 105 may selectively control implementation of engine on and off, keeping the transmission in gear, maintaining a current engine state to facilitate achieving or substantially achieving a desired operating characteristic of one or more particular parameters. For example, referring now to FIG. 5, a graph is shown how a shift affects NOx emissions, according to an example embodiment. Graph 500 includes curve 501, which represents an engine NOx parts-per-million (ppm) output amount, curve 502 which represents the EGR valve position, curve 503 which represents an intake oxygen amount, and curve 504 which represents the a gear shift event. At region 505, a gear shift occurs. In response, a substantial spike (region 506) in NOx occurs. Based on this Applicant-acquired data, although may selectively control the transmission setting. For example and in regard to the $10^{th}$ and $9^{th}$ gear example above, while the module 235 may determine that $10^{th}$ gear better achieves a net zero power output relative to $9^{th}$ gear, however, because the current transmission setting is $9^{th}$ gear and to avoid a likely NOx spike, the controller 105 may maintain $9^{th}$ gear at the detriment of coasting but to the benefit of NOx reductions.

Figure 5:
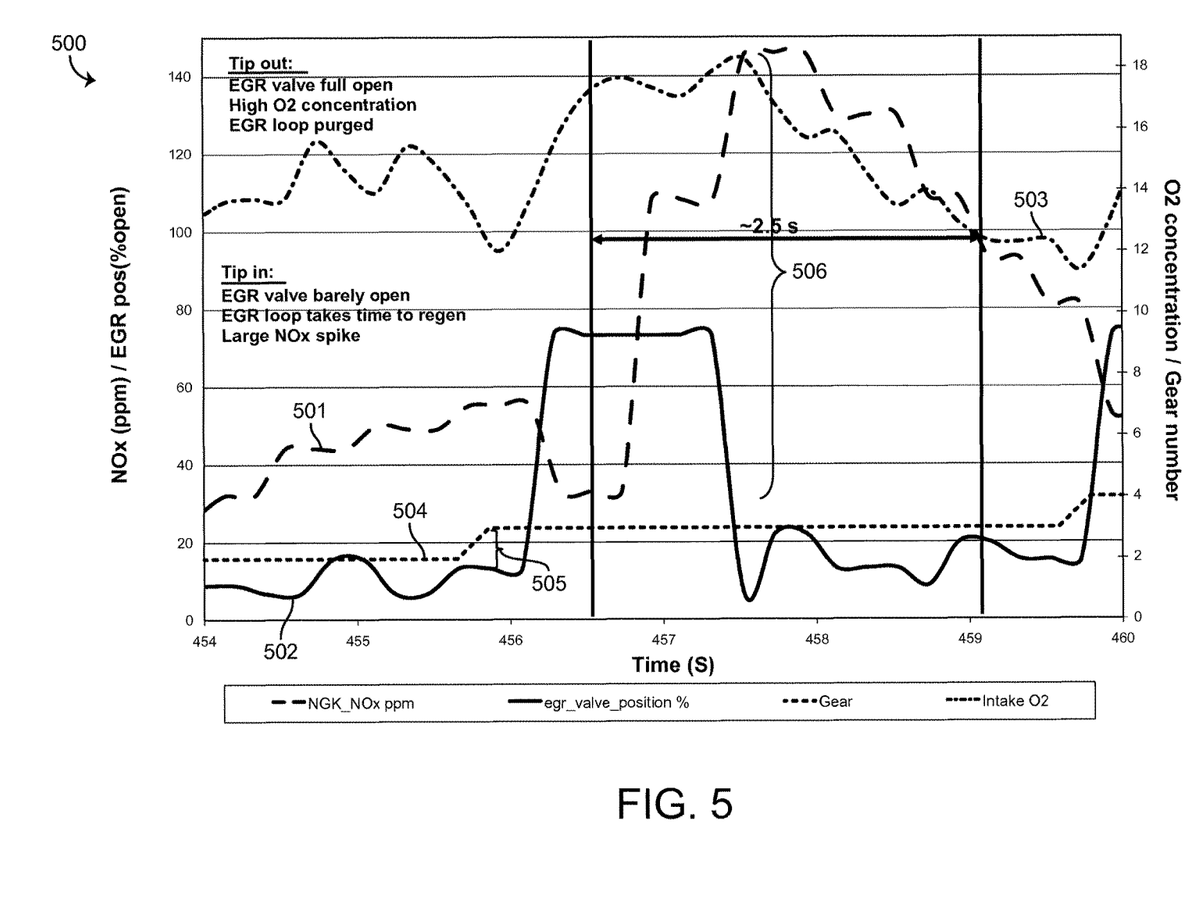
FIG. 5 is a graph depicting the effect of a gear shift on various vehicle operating parameters, according to an example embodiment.

In a similar manner, if fuel economy is desired, the controller 105 may facilitate coasting for as long as possible (subject to one or more predefined conditions, such as when a grade indicates a certain amount or a vehicle speed decreases below a threshold). By facilitating coasting, the fuel consumption may be relatively lower than if motoring was used continuously.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., sensors 140) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising:
 a transmission;
 an engine operatively coupled to the transmission; and
 a controller communicably coupled to the transmission and the engine, the controller structured to:
  receive vehicle operation data during operation of the vehicle;
  determine that the vehicle is in a coasting state based on the vehicle operation data;
  determine that the engine is providing a negative torque responsive to the vehicle operation data;
  provide a command to at least one of the engine and the transmission to maintain the coasting state for the vehicle; and
  facilitate a net zero power output from the engine in connection with a powertrain in the vehicle by adjusting a transmission setting of the transmission.

2. The system of claim 1, wherein the command includes putting the transmission into an idle state and maintaining the idle state while the vehicle is in the coasting state.

3. The system of claim 2, wherein deactivation of the idle state is based on the vehicle operation data indicating at least one of an end to the coasting state and an upcoming end to the coasting state, wherein the vehicle operation data indicating the at least one of the end and the upcoming end to the coasting state includes at least one of a vehicle speed decrease below a predefined threshold, an engine speed reduction below a predefined threshold, and an engine torque reduction below a predefined threshold.

4. The system of claim 1, wherein the command includes shutting down the engine during the coasting state and selectively restarting the engine.

5. The system of claim 4, wherein restarting the engine is based on at least one of an operator input and the vehicle operation data indicating at least one of an end to the coasting state and an upcoming end to the coasting state, wherein the vehicle operation data indicating the at least one of the end and the upcoming end to the coasting state includes at least one of a vehicle speed decrease below a predefined threshold, an engine speed reduction below a predefined threshold, and an engine torque reduction below a predefined threshold.

6. The system of claim 1, wherein the controller is structured to increase fueling in the engine to facilitate the net zero power output from the engine in connection with a remaining torque output from the powertrain in the vehicle.

7. The system of claim 6, wherein the negative torque is based on the vehicle operation data indicating an engine torque that is less than at least one of a torque at a driveshaft, a torque at a wheel, and a torque at a differential in the vehicle.

8. The system of claim 1, wherein the coasting state is based on the vehicle operation data indicating at least one of an accelerator pedal depression less than a threshold, an input from an operator of the vehicle, and a downhill road grade within a predefined range.

9. A method, comprising:
 interpreting vehicle operation data regarding operation of a vehicle;
 determining that the vehicle is in a coasting state based on the vehicle operation data;
 controlling at least one of a transmission and an engine of the vehicle at least partially during the coasting state to at least one of facilitate and maintain the coasting state;
 receiving route data indicative of an upcoming terrain for a designated route of the vehicle;
 identifying a coasting state opportunity responsive to the route data;
 receiving dynamic data from at least one of another vehicle and an external network; and
 at least one of canceling the identified coasting state opportunity identified from the route data and adding a coasting state opportunity to the identified coasting state opportunity from the route data.

10. The method of claim 9, further comprising interpreting a vehicle operating parameter for the vehicle and controlling the at least one of the transmission and the engine responsive to the vehicle operating parameter.

11. The method of claim 10, wherein the vehicle operating parameter includes at least one of a fuel consumption rate and an emissions characteristic from the vehicle.

12. The method of claim 9, further comprising identifying a negative torque from the engine during the coasting state and adjusting fueling to the engine to substantially cancel the negative torque to maintain the coasting state.

13. An apparatus, comprising:
 a coasting state module structured to receive vehicle operation data and determine that the vehicle is in a coasting state based on the vehicle operation data;
 an active idle state management module structured to place a transmission of the vehicle into an idle state in response to the determined coasting state for the vehicle; and
 an engine stop/start module structured to selectively turn an engine on and off, wherein the engine stop/start module is structured to turn the engine off responsive to the determined coasting state for the vehicle;
 wherein the active idle state management module and the engine stop/start module are utilized at least one of independent of and in combination with each other during the determined coasting state for the vehicle.

14. The apparatus of claim 13, further comprising:
 a route module structured to receive route data for a designated route of the vehicle, wherein the coasting state module is structured to identify a coasting state opportunity for the vehicle for one or more segments of the route based on the route data in advance of the vehicle traversing the one or more segments; and
 a network communications structured to receive dynamic data from at least one of another vehicle and an external network, wherein the coasting state module is structured to at least one of identify an additional coasting state opportunity and modify the identified coasting state opportunity for the vehicle responsive to the dynamic data.

15. The apparatus of claim 13, further comprising an engine zero load control module structured to identify a negative engine torque and increase fueling for the engine to facilitate a substantially net zero power output from a powertrain of the vehicle to maintain the coasting state for the vehicle.

16. The apparatus of claim 13, further comprising a gear-based coast down module structured to adjust a transmission setting for the transmission to substantially achieve net zero power output from a powertrain of the vehicle to maintain the coasting state for the vehicle.

* * * * *